Aug. 13, 1957 J. R. DAVEY ET AL 2,802,937

TELETYPEWRITER STATION NETWORK INCLUDING MOBILE STATION

Filed May 5, 1954 3 Sheets-Sheet 1

INVENTORS J. R. DAVEY
A. WILSON
BY B. H. Jackson
ATTORNEY

Aug. 13, 1957 J. R. DAVEY ET AL 2,802,937

TELETYPEWRITER STATION NETWORK INCLUDING MOBILE STATION

Filed May 5, 1954 3 Sheets-Sheet 2

INVENTORS J. R. DAVEY
A. WILSON

BY [signature]

ATTORNEY

Aug. 13, 1957 J. R. DAVEY ET AL 2,802,937

TELETYPEWRITER STATION NETWORK INCLUDING MOBILE STATION

Filed May 5, 1954 3 Sheets-Sheet 3

INVENTORS J. R. DAVEY
A. WILSON
BY B. H. Jackson
ATTORNEY 2,802,937

TELETYPEWRITER STATION NETWORK INCLUDING MOBILE STATION

James R. Davey, Franklin Township, Somerset County, N. J., and Albert Wilson, East Rockaway, N. Y., assignors to Bell Telephone Laboratories, Incorporated, New York, N. Y., a corporation of New York Application May 5, 1954, Serial No. 427,807

12 Claims. (Cl. 250—8)

Figure 1:
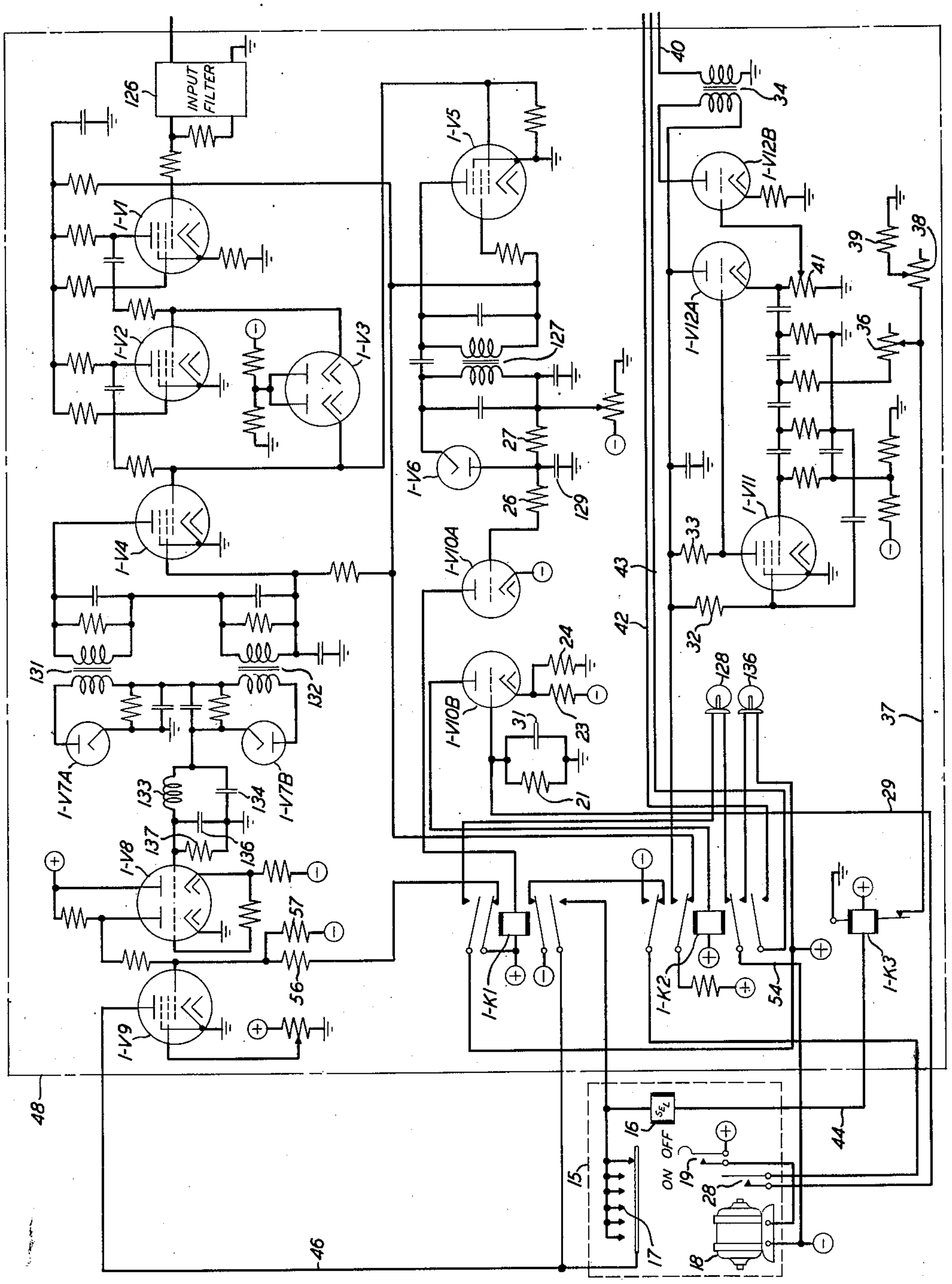

This invention relates to teletypewriter switching systems and particularly to switching arrangements for establishing intercommunication between mobile teletypewriter stations and fixed stations that are connected by lines or trunks to a switching office.

An object of the invention is to establish intercommunication between any of the fixed stations of a teletypewriter network and a mobile teletypewriter station.

Another object of the invention is to enable either a mobile station or one of the fixed stations of a teletypewriter network to initiate a request for communication with the other.

Another object of the invention is to provide an operator at a switching center with apparatus for supervising intercommunication between a mobile station and any one of the fixed stations of a teletypewriter network associated with the switching center.

Another object of the invention is to restrict transmission to one direction at a time and to preclude transmission to the opposite direction for a timed interval after cessation of transmission in either direction.

The invention features frequency shift telegraph signal generating equipment at the mobile station and at a fixed station which communicates by radio with the mobile station.

The invention also features frequency shift telegraph signal generating equipment including an oscillator circuit having its frequency of oscillation determined solely by resistive and capacitative components, and having the shifting of the frequency accomplished by the shorting and restoration of one of the resistive components.

The invention also features control relay circuits and sending and receiving relay circuits interposed between the frequency shift transmitting and receiving equipment of the fixed station, and a telegraph switching central office to enable traffic for the mobile station to be switched through and supervised at the central office.

In accordance with a preferred embodiment of the invention a mobile station, which may be a land vehicle, a water-borne craft or an aircraft, is provided with radio transmitting and receiving equipment, with voice frequency shift signal generating and demodulating equipment and with a teletypewriter printer and tape or keyboard transmitter. The frequency shift signal generating equipment is normally dormant, the radio transmitter is deactivated, the radio receiver, is turned on but is receiving no signals, and a mark-hold circuit associated with the output of frequency shift demodulating equipment holds the teletypewriter recorder in the marking condition.

A fixed station has radio transmitting and receiving equipment capable of transmitting to and receiving from the mobile station, the radio transmitter being normally deactivated and the radio receiver being turned on but receiving no signals. Also, the fixed station has normally deactivated frequency shift signal generating equipment and frequency shift demodulating equipment, these being similar to the corresponding apparatus of the mobile station. In addition, the fixed station is connected by a transmission channel to a telegraph central office, and is provided with a line terminating circuit which gives the fixed station characteristics similar to any other subscriber station served by the central office, so that the fixed station may be called by the switching center or may register a call at the switching center.

The mobile station places a call by operating the telegraph transmitter to generate any telegraph code combination. The teletypewriter recorder at the mobile station responds to the code combination, and incident to that response it activates the radio transmitter and also the voice frequency shift signal generator, the generator being caused to generate marking and spacing frequencies in accordance with the elements of the code combination and the radio carrier being modulated in accordance with those frequencies. Following the transmission of the telegraph code combination, a timing circuit maintains the frequency shift signal generator and the radio transmitter activated for a predetermined interval and then deactivates both.

The radio receiver at the fixed station receives and demodulates the signals received from the fixed station, the output of the radio receiver supplying to a frequency discriminating circuit the marking and spacing frequencies comprising the code combination followed by a steady marking signal until the frequency shift signal generator and the radio transmitter at the mobile station are deactivated. A timing circuit controlled by the signals incoming to the fixed station from the mobile station precludes activation of the frequency shift signal generator at the fixed station for a predetermined interval after the cessation of transmission from the fixed station. In response to the code combination received from the mobile station, a monitoring teletypewriter printer at the fixed station is activated and responds to the code combination, and in addition the code combination is repeated over the channel to the switching center, the code combination registering an incoming call.

An operator at the switching center transmits the customary call acknowledgment signals to the fixed station where they are repeated by a repeating relay, and incident to the reception of the acknowledgment signals at the fixed station the frequency shift signal generator and the radio transmitter are activated, the repeated acknowledgment signals causing the generation of corresponding marking and spacing frequencies which modulate the carrier of the radio transmitter. During the transmission of the acknowledgment signals by radio to the mobile station, a mark-hold circuit at the fixed station is effective to prevent signals from being repeated toward the switching center if such signals should be received from the mobile station.

The acknowledgment signals are received and demodulated at the mobile station and are recorded by the teletypewriter printer at that station, controlled from the output of a frequency discriminator circuit. During reception of the acknowledgment signals and for a timed interval after the end of those signals, the mark-hold circuit at the mobile station is disabled so that the teletypewriter printer may respond to the signals, and the transmitter at the mobile sation is disabled during the reception of the acknowledgment signals and during the additional timed interval.

At the expiration of the timed interval the attendant at the mobile station operates the transmitter to transmit to the switching center the number or other calling code of the teletypewriter exchange subscriber with which the mobile station wishes to communicate. A timed interval after the last signal of the called subscriber code, the frequency shift signal generator and the radio transmitter at the mobile station are again deactivated.

At the switching center the operator receives the information, relayed through the fixed station, identifying the called subscriber station, and proceeds to establish a connection with that station, directly if the station is served by the switching center or indirectly over a trunk or trunks in tandem and through other switching centers to the called subscriber's line. When the called subscriber has answered, the operator transmits to the fixed station, for retransmission by radio to the mobile station, a go-ahead signal. Thereupon the attendant at the mobile station transmits his message by radio to the fixed station where it is repeated to the switching center and onward to the called subscriber station. The mobile subscriber and the called subscriber may transmit back and forth, in one direction at a time, until they have completed the desired intercommunication. At the end of the intercommunication, either station may transmit a disconnect or end-of-message signal. The monitoring printer at the fixed stations has monitored all of the transmission between the two subscribers, and in response to the disconnect signal the monitoring printer operates contacts which restore the circuits at the fixed station to the idle condition, the monitoring printer being shut down incident to that restoration. The restoration of the circuits of the fixed station to normal results in the operation of a disconnect indicator, such as a lamp, at the switching center, and this authorizes the operator to take down the connection between the fixed station line and the line or trunk over which the called subscriber station was reached.

Figure 2:
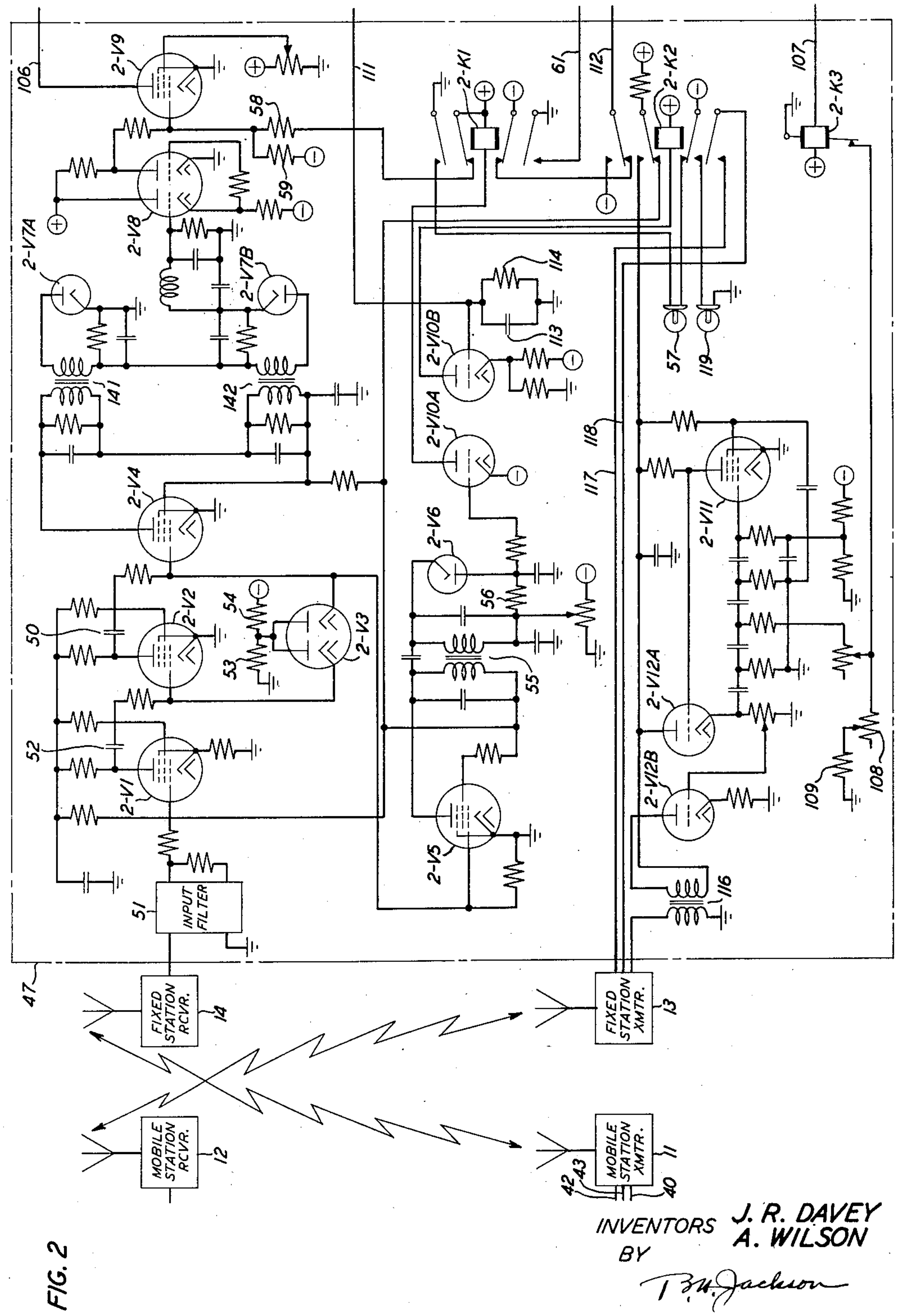
Figure 3:
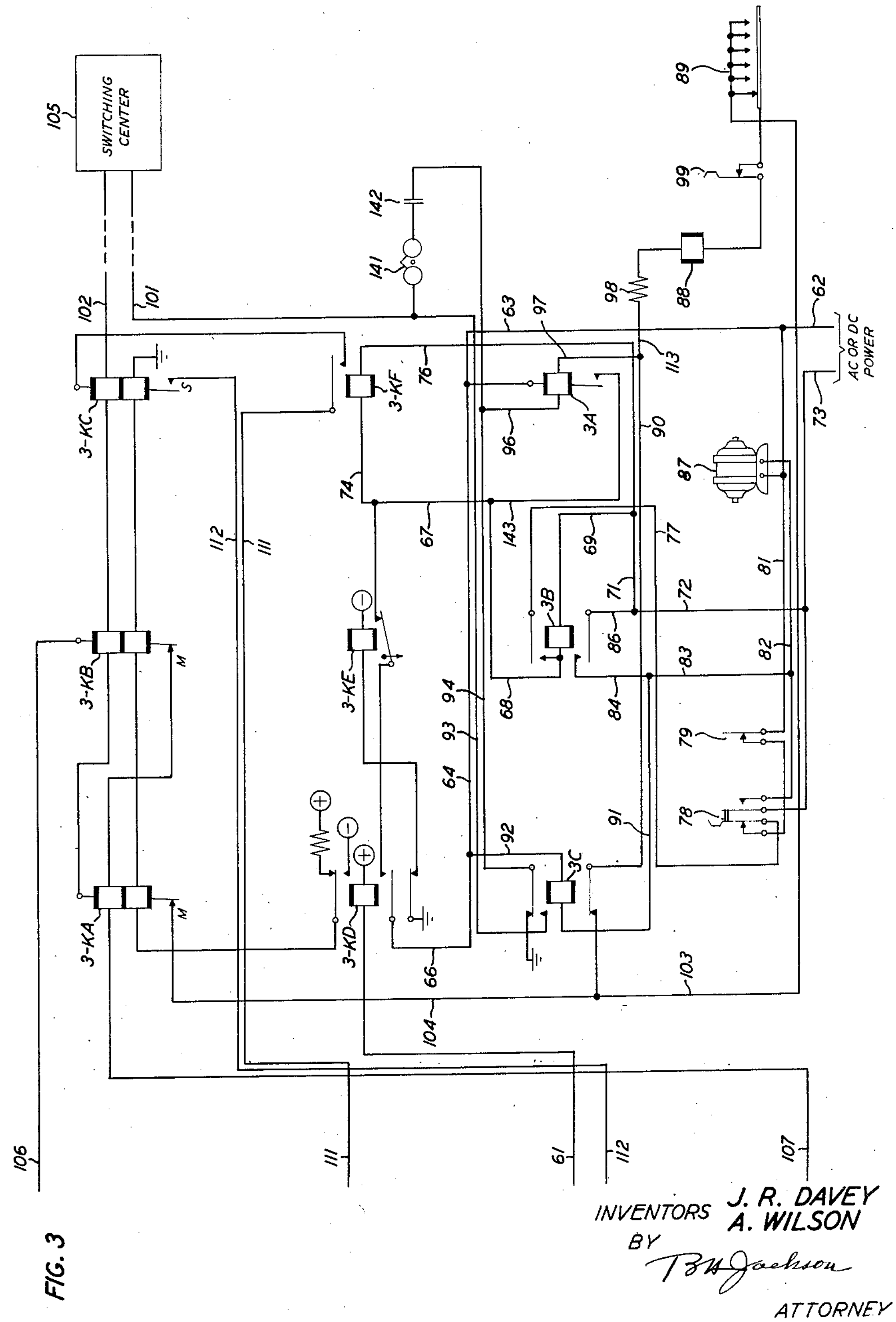

For a complete understanding of the invention reference may be had to the following detailed description to be interpreted in the light of the accompanying drawings, in which:

Fig. 1 is a circuit diagram showing the apparatus comprising a mobile teletypewriter station; and Figs. 2 and 3 together comprise a schematic showing of a fixed station through which a teletypewriter switching center serves mobile teletypewriter subscriber stations.

Referring now to the drawings and particularly to Fig. 2, the reference numerals 11 and 12 designate the radio transmitter and radio receiver, respectively, of a mobile teletypewriter station which may be a motor vehicle, an aircraft or a ship. The reference numerals 13 and 14 designate the radio transmitter and receiver, respectively, of a radio station connected by land line to a teletypewriter switching center which is part of a teletypewriter network including subscriber stations served by the switching center and connected thereto by lines, and other switching centers connected thereto by trunks and serving other subscriber stations. Mobile radio transmitter 11 is arranged to transmit a radio frequency carrier that radio receiver 14 is tuned to receive, and radio transmitter 13 of the switching center is arranged to transmit a radio frequency carrier that mobile radio receiver 12 is arranged to reecive.

The circuits and apparatus of the mobile station, shown in Fig. 1, will be described beginning with the assumption that a call is initiated by the operator of the mobile station. The mobile station is provided with a teletypewriter receiving recorder and transmitter which is represented symbolically by the well-known selector magnet 16 representing the receiving recorder, and the transmitter contacts 17 representing a keyboard transmitter, contained in dotted rectangle 15 which represents the complete teletypewriter. Transmitting and receiving teletypewriters which might be employed for this apparatus are shown in Patent 1,745,633 granted February 4, 1930, to S. Morton and H. L. Krum, the subject of that patent being a tape printer, and in Patent 1,904,164 granted April 18, 1933 to S. Morton, H. L. Krum and E. E. Kleinschmidt disclosing a page printer. The units shown in those patents might be somewhat bulky and heavy for use in certain mobile services, such as small motor vehicles or aircraft, and for those services a smaller and lighter receiving printer and keyboard transmitter, such as the one shown in Patent 2,339,313 granted January 18, 1944, to W. J. Zenna, may be employed.

Sending and receiving teletypewriters, of whatever type are driven by a motor, and the driving motor for the printer 15 is designated by reference numeral 18. Motor 18 is set in operation by the connection of battery thereto through switch 19.

With battery connections to the various circuits as indicated in Fig. 1, relay 1–K2 is normally operated in a path from positive battery through its winding and the discharge path of electron discharge tube 1–V10B to the cathode of that tube. This tube is conductive because its grid is at ground potential applied through resistor 21 and its cathode is negative with respect to ground because of its connection to a potential divider comprising resistors 23 and 24 connected between ground and negative battery. Relay 1–K1 is also operated in a path traced from positive battery through its winding, the discharge path of electron discharge tube 1–V10A to negative battery, this tube being conductive becaue its cathode is connected to negative battery and its grid is connected through resistors 26 and 27 to the contactor of a potentiometer which is connected between negative battery and ground. Accordingly, the potential applied to the grid of tube V–10A is more positive than the potential on the cathode.

With the relays 1–K1 and 1–K2 operated, a negative battery connection is traced from the inner lower armature and front contact of relay 1–K1, front contact and outer upper armature of relay 1–K2 to one of the contact springs of normally open contacts 28. These contacts are auxiliary contacts of the teletypewriter and are closed during a part of each cycle of operation of the teletypewriter.

A call from the mobile station is initiated by the generation of any teletypewriter code combination by the operation of any key of the keyboard transmitter. Contacts 28 close incident to the response of the teleyptwriter to the code combination and extend the connection of negative battey over conductor 29 to the grid of tube 1–V10B and to condenser 31, instantaneously charging the condenser to the full negative battery potential, and cutting off tube 1–V10B. Upon the opening of contacts 28, condenser 31 begins to discharge through shunting resistor 21. If another closure of contacts 28 does not occur before condenser 31 has discharged through resistor 21 and has restored ground potential to the grid of tube 1–V10B, that tube will be restored to conductivity. Condenser 31 and resistor 21 thus delay reactivation of tube 1–V10B for an interval, the significance and/or magnitude of which will be described hereinafter.

With tube 1–V10B cut off, relay 1–K2 is released and it will remain released until tube 1–V10B reoperates. With relay 1–K2 released, positive battery is connected through its inner upper armature and back contact to the screen and anode load resistors 32 and 33, respectively, of electron discharge tube 1–V11, to the anode of electron discharge tube 1–V12A and through the primary winding of transformer 34 to the anode of electron discharge tube 1–V12B. Tubes 1–V11 and 1–V12A, together with a phase shift network of series condensers and shunt resistors connected between the grid of tube 1–V11 and the cathode of 1–V12A, comprise an audio frequency oscillator. A path is traced from the network through variable resistor 36, conductor 37 and the single contact and armature of relay 1–K3 to ground. The armature of relay 1–K3 engages its single contact when teletypewriter 15 is generating a marking condition, as will be described hereinafter, and variable resistor 36 adjusts the frequency of the oscillator to a value which is designated as the marking frequency. When relay 1–K3 operates to the spacing condition, a shunt is removed from variable resistor 38 and fixed resistor 39, and these elements in series are included in the path from the contactor of variable resistor 36 to ground. The frequency of the oscillator is changed by the removal of the shunt around resistors 38 and 39, and this frequency represents a spacing condition and is adjustable by means of variable resistor 38.

Tube 1–V12B is an amplifier tube having its grid connected to a contactor associated with the cathode resistor 41 of tube 1–V12A, the resistor 41 serving as a level control to determine the magnitude of the oscillatory potential applied to the grid of tube 1–V12B. This tube amplifies the frequency, marking or spacing, generated by the oscillator and impresses it through transformer 34 and conductor 40 on the modulation circuit of radio transmitter 11.

With relay 1–K2 released, conductors 42 and 43 become interconnected at its outer lower armature and back contact, and these conductors are connected to the transmitter 11, and upon being interconnected by relay 1–K2, they activate the transmitter to cause the transmission of its carrier frequency. During the transmission of the character which initiated the release of relay 1–K2 the carrier is modulated by the marking and spacing frequencies because the frequency of the oscillator is shifted back and forth between the marking and spacing frequencies by virtue of the fact that relay 1–K3 is controlled by transmitter 17, the circuit being traced from battery through the winding of relay 1–K3, conductor 44, the winding of selector magnet 16 of teletypewriter 15, the contacts of transmitter 17, conductor 46 and the discharge path of tube 1–V9 to ground. Because of circuit conditions which will be described in detail hereinafter, tube 1–V9 is at this time conductive under the control of its grid. Each time that the energizing path for relay 1–K3 is interrupted for a spacing signal, the shunt around resistors 38 and 39 is removed and the carrier generated by radio transmitter 11 is modulated by the spacing frequency. It will be recognized that this mode of signal transmission is of the type commonly called frequency shift transmission in which marking signals are of one frequency and spacing signals are of another frequency.

Following the generation of the code combination the rest or marking condition is generated by transmitter 17, causing the transmission of a steady marking signal by radio transmitter 11. This transmission of the marking signal continues until condenser 31 has discharged and reactivated tube 1–V10B. The interval for reactivation of the tube may be a few seconds, three seconds being a suitable duration of the interval, and upon the reactivation of tube 1–V10B, relay 1–K2 is operated to remove anode potentials from oscillator tubes 1–V11 and 1–V12A and from amplifier tube 1–V12B and the transmission of the carrier by radio transmitter 11 is suspended by the disconnection of conductor 42 from conductor 43.

The marking and spacing elements of the code combination followed by the marking signal of a few seconds duration are transmitted by radio transmitter 11 and are received by radio receiver 14 of the fixed station. The fixed station has a frequency shift transmitting and receiving circuit, comprising the circuits contained within the dotted line rectangle 47 corresponding to that of the mobile station contained within the dotted line rectangle 48 in Fig. 1, a portion of which has already been described. The received radio carrier modulated by the marking and spacing signals is demodulated by the radio receiver 14 to derive therefrom the marking and spacing frequencies and these frequencies are impressed upon an input filter 51, the output of which is connected to the grid of amplifier tube 2–V1. The amplified signals appearing at the anode of tube 2–V1 are impressed through blocking condenser 52 upon the control grid of tube 2–V2 in which the signals are further amplified. The grid return for tube 2–V2 includes the left-hand diode of twin diode tube 2–V3 and a potential divider comprising resistors 53 and 54 connected between negative battery and ground, and the left-hand diode of tube 2–V3 serves as a limiter. The amplified signals appearing at the anode of tube 2–V2 are impressed through blocking condenser 50 upon the grids of tubes 2–V4 and 2–V5 in parallel, and a limiting action is provided by the right-hand diode of tube 2–V3 which has its cathode connected to the control grids of tubes 2–V4 and 2–V5 and has its anode connected to the same potential divider as the anode of the left-hand diode.

The result of the application of the signals to the control grid of tube 2–V4 is not of interest at this time. The signals applied to the control grid of tube 2–V5 are amplified and are applied to transformer 55 which has a high ratio of reactance to resistance, a characteristic commonly called high Q. Transformer 55 acts as a narrow band-pass filter for the marking frequency. The marking signal elements, passing through transformer 52, are applied through resistor 56 to diode tube 2–V6, the resistor 56 being the load resistor for the diode and corresponding to resistor 27 in Fig. 1. The audio frequency signal is rectified in tube 2–V6, carrying the anode toward negative and with it the grid of tube 2–V10A cutting off that tube. The winding of relay 2–K1 is included in the anode circuit of tube 2–V10A and the relay releases.

With relay 2–K1 released, and relay 2–K2 operated, as it is connected in the anode circuit of tube 2–V10B, receiving indicator lamp 57 is lighted in a circuit from negative battery, inner lower armature and front contact of relay 2–K2, back contact and outer upper armature of relay 2–K1 to ground. At its inner upper armature, relay 2–K1 removes positive battery from one end of a potential divider comprising resistors 58 and 59, to the junction of which the control grid of tube 2–V9 is connected. The disconnection of positive battery from resistor 58 removes a marking hold from tube 2–V9 and renders the control grid of that tube responsive to the right-hand triode of tube 2–V8.

It will be observed that the grounded outer lower armature of relay 2–K1, upon being released, completes the circuit of relay 3–KD over conductor 61. Relay 3–KD interrupts at its outer lower armature and back contact the circuit of slow-release relay 3–KE. With relay 3–KD operated, and before relay 3–KE releases, a circuit is traced from power supply conductor 62 through conductors 63, 64 and 66, the inner lower armature and front contact of relay 3–KD, the single armature and front contact of relay 3–KE, conductors 67 and 68, winding of relay 3–B, and conductors 69, 71 and 72 to power supply conductor 73, operating relay 3–B. A circuit is also traced from the front contact of relay 3–KE through conductor 74, the winding of relay 3–KF and conductors 76, 71 and 72 to power supply conductor 73, and that relay operates. Relay 3–B locks through its front contact and upper armature, conductor 77, normally closed contacts of a manually operable teletypewriter motor starting switch 78, signal responsive motor stop contacts 79 and conductor 81 to power supply conductor 62. Relay 3–KF also locks through the upper armature and front contact of relay 3–B and conductors 68, 67 and 74, winding of relay 3–KF and conductors 76, 71 and 72 to conductor 73. Relay 3–B closes contacts in shunt with the normally open manually operable motor starting contacts, from power supply conductor 62 through the motor, conductors 82, 83 and 84, front contact and lower armature of relay 3–B and conductors 86 and 72 to the power supply conductor 73, and the teletypewriter operating motor 87 is set in operation. The teletypewriter that is operated by motor 87 may be of the same type as that indicated in Fig. 1, and includes selector magnet 88 and transmitting contacts 89. This is a monitoring teletypewriter, preferably located at the radio receiving station which will be situated at a point suitable for radio reception and not necessarily on the same premises as the switching center at which the call from the mobile station will be answered.

With relay 3–B operated, an energizing circuit for relay 3–C is traced from power supply conductor 73, through conductors 72 and 86, lower armature and front contact of relay 3–B, conductors 84 and 91, winding of relay 3–C and conductors 92, 64 and 63 to the power supply conductor 62, and relay 3–C operates. This relay closes a line circuit extending to the remote switching center, and comprising line conductors 101 and 102, the interconnection between the two conductors being traced from conductor 101 through conductor 93, the front contact and upper armature relay 3–C, conductors 94 and 96, winding of relay 3–A, conductor 97, resistor 98, selector magnet 88 of the monitoring teletypewriter, break key 99, transmitting contacts 89, conductors 103 and 104, break contacts of relay 3–KA, and operating windings of relay 3–KB and 3–KC in series, to line conductor 102.

The switching center may be of the type shown in Patent 2,237,154 granted April 1, 1941, to G. A. Locke and F. S. Kinkead, and is represented in Fig. 3 by rectangle 105. Conductors 101 and 102 may be considered as corresponding to the conductors designated T and R in Fig. 1 of the Locke et al. patent, from which it follows that the apparatus in Figs. 2 and 3 of the present specification may be substituted for the subscriber station circuit above and to the left of the dotted line X—X of Fig. 1 of the Locke et al. patent. It will be apparent from this that the mobile station is a subscriber station served by the switching center over the land line comprising line conductors 101 and 102 to the subscriber's line terminating circuit, which is the relay circuit in Figs. 2 and 3, the land line signals being converted to frequency shift signals and vice versa, transmission between the mobile station and its line termination circuit being by radio. The monitoring teletypewriter comprising transmitter 89 and selector magnet 88 records all signals passing to and from the line terminating circuit and is equipped to transmit in the event of any trouble condition necessitating the origination of information at the radio station.

As is set forth in the Locke et al. patent, the closure of the line circuit comprising conductors 101 and 102 causes the lighting of a call lamp at the switching center, to which an answering operator responds by plugging a teletypewriter set into the jack which terminates line conductors 101 and 102 and by transmitting an acknowledgement signal, usually the signals for carriage return and line feed followed by the signals representing the characters OPR.

It was previously stated that the transmission of the marking signal from the mobile station to the fixed radio station ends after a few seconds due to the discharging of condenser 31. Upon the cessation of the marking signal, the negative voltage developed by diode 2–V6 that cuts off tube 2–V10A is removed from the grid of the latter tube and the tube becomes conductive, reoperating relay 2–K1. Relay 2–K1 releases relay 3–KD which reoperates relay 3–KE. Relay 3–B remains locked, holding relays 3–C and 3–KF operated and motor 87 in operation.

Relays 3–KB and 3–KC respond to the acknowledgment signals transmitted by the operator at the switching center. With relay 3–KD released, as previously described, positive battery is connected through its back contact and upper armature to the biasing windings of relays 3–KA, 3–KB and 3–KC in series. This polarity on the biasing windings of relays 3–KB and 3–KC biases those relays to spacing so that when the line circuit is interrupted at the switching center in response to each spacing impulse the relays 3–KB and 3–KC will operate to spacing. The polarity applied to the biasing winding of relay 3–KA is such as to bias that relay to marking so that when the circuit of its operating winding is interrupted upon operation of relay 3–KB to spacing the armature of relay 3–KA will not leave its marking contact. The armature of relay 3–KB is connected by conductor 106 to the anode of the tube 2–V9. From the marking contact of relay 3–KB a path is traced through the operating winding of relay 3–KA, conductor 107, and the winding of relay 2–K3 to positive battery. This circuit corresponds to the circuit in Fig. 1 from positive battery through the winding of relay 1–K3, conductor 44, teletypewriter selector magnet 16, transmitting contacts 17 and conductor 46 to the anode of tube 1–V9. With relay 2–K1 operated, which is the present condition, tube 2–V9 is rendered conductive steadily and current flows to hold relay 2–K3 in the marking condition, shorting out the resistors 108 and 109 corresponding to resistors 38 and 39, and thereby causing the audio frequency oscillator at the fixed station, comprising tubes 2–V11 and 2–V12A to generate the marking frequency or tone.

In response to the first spacing element of the first code combination transmitted by the operator, the start element of the carriage return signal, assuming that the operator transmits the carriage return and line feed signals and the characters OPR, relay 3–KC operates its armature into engagement with the spacing contact, interconnecting conductors 111 and 112 through the armature and front contact of relay 3KF which is locked operated. Conductor 111 is connected to the grid of tube 2–V10B and is also connected to ground through resistor 114 shunted by condenser 113. Conductor 112 is connected through the outer upper armature and front contact of relay 2–K2 and the front contact and inner lower armature of relay 2–K1 to negative battery. Relay 3–KC has the same function as auxiliary contacts 28 of the mobile station in Fig. 1, which is to condition the frequency shift equipment at the fixed station for transmission. Relay 3–KC accomplishes this by cutting off tube 2–V10B through the application thereto of the negative potential. Condenser 113 becomes charged negatively and delays the activation of tube 2–V10B after the negative potential has been removed. Relay 2–K2 is connected in the anode circuit of relay 2–V10B and releases, connecting the negative battery directly to conductor 112 through its back contact and outer upper armature, connecting positive battery to the anode of tube 2–V12A, and through the primary winding of transformer 116 to the anode of tube 2–V12B, and to the screen electrode and anode of tube 2–V11. Tubes 2–V11 and 2–V12A, together with a phase shaft network, comprise an audio frequency oscillator like the one composed of correspondingly identified tubes at the mobile station in Fig. 1. With relay 2–K2 released, conductors 117 and 118 become interconnected through the outer lower armature and back contact to activate transmitter 13 and initiate the generation of its carrier frequency. At its inner lower armature and back contact, relay 2–K2 lights lamp 119 to indicate that the circuit is in the transmitting condition.

Relay 3–KB also responds to the spacing element by disconnecting the anode of tube 2–V9 from the winding of relay 2–K3, thereby releasing the latter relay. At its break contacts, relay 2–K3 removes a shunt around resistors 108 and 109 to shift the transmitting oscillator from its marking to its spacing frequency. The frequencies generated in the transmitting oscillator are impressed through the secondary of transformer 116 on transmitter 13 in which they modulate the carrier. Relay 2–K3 follows the marking and spacing elements of the carriage return and line feed signals and of the signals representing the characters OPR and correspondingly causes the marking and spacing frequencies to be impressed on the modulation equipment of transmitter 13.

The signals transmitted by radio transmitter 13 are received by radio receiver 12, are demodulated, and the marking and spacing frequencies thus derived are impressed on input filter 126 of the frequency shift receiving equipment at the mobile station in Fig. 1. This circuit substantially duplicates the circuit of the receiver equipment at the fixed station, and the received marking and spacing signals are amplified by amplifier stages in cascade comprising tubes 1–V1 and 1–V2, are limited by the diodes of tube 1–V3 and are impressed on the grids of tubes 1–V4 and 1–V5. The first marking element passing through transformer 127, which acts as a narrow band-pass filter for the marking frequency, is rectified by diode tube 1–V6 to produce a potential across diode load resistor 27. This potential is applied to the grid of tube 1–V10A and cuts off the tube, releasing relay 1–K1 which is in the plate circuit of tube 1–V10A. Relay 1–K1 disconnects at its inner upper armature and front contact positive battery from the grid of tube 1–V9, leaving that tube responsive to control from the anode of the left-hand triode of tube 1–V8 which is cathode-driven by the right-hand triode of the same tube. At its outer upper armature and back contact, relay 1–K1 lights receiving lamp 128. At its outer lower armature and back contact, relay 1–K1 connects a shunt around transmitting contacts 17 which are included in the external plate circuit of tube 1–V9 along with the winding of selector magnet 16 of printer 15 and the winding of relay 1–K3. Operation of the keyboard of printer 15 while relay 1–K1 is released will not cause the operation of the selector magnet or relay 1–K3 because of the shunt around the transmitting contacts. At its inner lower armature and front contact, relay 1–K1 disconnects negative battery from normally open auxiliary contacts 28 to prevent the cutting off of tube 1–V10B upon the momentary closure of auxiliary contacts when teletypewriter printer 15 responds to incoming signals.

Tube 1–V5 responds to all signals received from the fixed station and each marking element is passed by transformer 127 and is rectified by tube 1–V6. Condenser 129 associated with resistor 27 becomes charged by the voltage developed across resistor 27 due to the rectification of the marking signal frequency and holds tube 1–V10A cut off during the spacing elements normally occurring in signals, during which transformer 127 passes no current. Relay 1–K1 thus remains released to maintain the mobile station in the receiving condition.

The received signals, having been amplified also by tube 1–V4, as previously described, are impressed upon a discriminator circuit comprising transformers 131 and 132 and diodes 1–V7A and 1–V7B associated with the secondaries of the respective transformers. The output of the discriminator is connected through a low-pass filter comprising inductance 133 and condensers 134 and 136 to the grid of the right-hand triode of tube 1–V8, the grid being returned to ground through resistor 137. The action of the discriminator is such that the grid of the right-hand triode of tube 1–V8 is made negative for marking and positive for spacing. Corresponding voltage conditions appear at the cathode of the right-hand triode of the tube and are impressed on the grid of the left-hand triode, so that both triodes are substantially cut off for the marking condition and are conductive for the spacing condition. With the left-hand triode cut off, a positive potential is applied to the grid of tube 1–V9 rendering that tube conductive to pass marking current through selector magnet 16. When the discriminator circuit impresses a positive potential on the grid of the right-hand triode of tube 1–V8 in response to the spacing frequency, the conductivity of both triodes increases, the grid of tube 1–V9 swings toward negative, reducing the conductivity sufficiently to release selector magnet 16. In this way the received signals are impressed on teletypewriter printer 15. Relay 1–K3 follows the received signals but does not cause their retransmission because relay 1–K2 remains energized during reception, withholding plate voltage from the transmitting oscillator, which remains dormant.

Following the transmission of the operator's response, the operator awaits transmission from the mobile station as to the identity of the called subscriber. Relays 3–KB and 3–KC remain in the marking condition, the latter relay permitting condenser 113 to discharge, rendering tube 2–V10B conductive and thereby operating relay 2–K2. The relay deactivates the transmitting frequency shift oscillator of the fixed station and suspends the transmission of carrier from radio transmitter 13.

With the transmission of the carrier suspended, the marking frequency is removed from tubes 1–V4 and 1–V5, the rectifying action of diode 1–V6 ceases, the charge leaks off condenser 129, tube 1–V10A is rendered conductive and relay 1–K1 reoperates. This removes the shunt around transmitting contact 17, places a marking hold on tube 1–V9 and extinguishes receiving lamp 128.

The subscriber at the mobile station then operates transmitting contacts 17 of teletypewriter 15 to transmit the exchange designation and the line number of the subscriber station that he wishes to call. Auxiliary contacts 28 close to cut off tube 1–V10B in the manner previously described, thereby releasing relay 1–K2 to activate the transmitting frequency shift oscillator and to initiate the transmission of carrier from radio transmitter 11. With relay 1–K2 released, the circuit of transmission lamp 136 is completed and that lamp lights.

The signals transmitted by the mobile station are received by the radio receiver 14 of the fixed station, are demodulated and the marking and spacing signal frequencies are impressed on tubes 2–V4 and 2–V5. Diode 2–V6 rectifies the marking frequency passed by transformer 55 and cuts off tube 2–V10A thereby releasing relay 2–K1. That relay lights receiving lamp 57, removes a marking hold from tube 2–V9, disconnects negative battery from conductor 112 and grounds conductor 61. Relay 3–KD operates over conductor 61, reversing the bias on relays 3–KA, 3–KB and 3–KC to bias relay 3–KA to spacing and relays 3–KB and 3–KC to marking. Relay 3–KD performs no other operations at this time, since, relays 3–B, 3–C and 3–KF are operated and locked. The removal of negative battery from conductor 112 prevents the cutting off of tube 2–V10B and thus prevents the activation of the transmitting frequency shift oscillator at the fixed station.

The marking and spacing frequency signals rectified by tube 2–V4 are impressed on a discriminator circuit comprising transformers 141 and 142 and associated diodes 2–V7A and 2–V7B. The output of the discriminator is amplified in the two triode sections of tube 2–V8 and is impressed on the grid of tube 2–V9, cutting off that tube in response to spacing signals and rendering the tube conductive in response to marking signals. The operating winding of relay 3–KA and the operating winding of relay 2–K3 are connected in the plate circuit of tube 2–V9, and with the cutting off of current in that circuit the current through the biasing winding of relay 3–KA is effective to operate the armature to spacing. In response to each spacing signal element the relay 3–KA interrupts the loop circuit terminating the line comprising conductors 101 and 102, thereby repeating the signals over the line to the switching center. Selector magnet 88 of the monitoring teletypewriter is included in that loop through the upper armature and front contact of relay 3–C which is operated, so that the identifying information as to the called subscriber station is recorded by the monitoring printer.

The operator at the switching center proceeds to call the desired subscriber over local or toll lines or radio circuits, in case the called subscriber station is also a mobile station, or any combination of lines or circuits by which the called subscriber may be reached. When the called subscriber has answered, the operator establishes a transmission connection, through repeater equipment if necessary, to the line comprising conductors 101 and 102 and transmits to the subscriber of the mobile station in Fig. 1 a go-ahead signal. Thereafter, the mobile station and the called subscriber station may communicate back and forth telegraphically through the frequency shift receiving and transmitting equipment in rectangles 47 and 48.

Assuming that the mobile station begins the transmission, since that station made the call, the relay 1–K2 is released, disconnecting at its inner upper armature and front contact positive battery normally supplying anodes and screen electrodes of tubes 1–V1, 1–V2, 1–V4 and 1–V5 thus preventing reception of any interfering signals. Relay 1–K1 is operated, maintaining a marking hold on tube 1–V9 and removing the shunt across transmitting contacts 17. The mobile station subscriber proceeds with the transmission, the message signals being generated by relay 1–K3 which shifts the frequency of the oscillator according to the marking and spacing elements of the signals. The signals are transmitted by radio transmitter 11 and received and demodulated by radio receiver 14 of the fixed station. The first marking element cuts off tube 2–V10A which remains cut off and releases relay 2–K1, removing the marking hold from tube 2–V9 and maintaining a steady ground on conductor 61. Tube 2–V9 repeats the signals to relay 3–KA which in turn repeats them over transmission conductors 101 and 102 to the switching center, from which they are retransmitted onwardly to the called subscriber station. With conductor 61 grounded, relay 3–KD operates and remains operated, providing a bias which enables relay 3–KA to repeat the signals and which prevents relays 3–KB and 3–KC from operating in response to them. Relay 3–KD releases relay 3–KE, which has a slow-release characteristic. These relays, when they responded to the calling signal of the mobile station, caused the operation of relays 3–B and 3–KF, and relay 3–B locked independently of relays 3–KD and 3–KE. The relay 3–B operated relay 3–C and locked relay 3–KF, so that none of the relays 3–B, 3–C and 3–KF released when relay 3–KD was released and caused the reoperation of relay 3–KE in the interval between reception of the calling signal from the mobile station and transmission of the response of the operator at the switching center.

When the mobile station completes the transmission of message information to the called station and stops transmitting, condenser 31 discharges and tube 1–V10B is reactivated, reoperating relay 1–K2. This relay disables the transmitting oscillator and reconnects plate and screen potentials to the tubes ahead of the discriminator circuit in the receiving amplifier, in preparation for responsive transmission from the called station. At the fixed station, the cutting off of the marking frequency by the mobile station results in the reactivation of tube 2–V10A which effects the reoperation of relay 2–K1. This relay renders tube 2–V9 insensitive to signals and releases relay 3–KD which reoperates relay 3–KE, the relay 3–KD reversing the bias on relays 3–KA, 3–KB and 3–KC but otherwise having no effect on the other relays in Fig. 3. If the called subscriber begins to transmit, relay 3–KC, upon operating to spacing, cuts off tube 2–V10B which releases relay 2–K2, placing the fixed station in the transmitting condition. The responsive message material retransmitted by the fixed station is received by radio receiver 12 of the mobile station, the first marking element cutting off tube 1–V10A to release relay 1–K1, and thereby to disable keyboard transmitter 17, and to render tube 1–V9 responsive to the incoming message signals which are thereby repeated to selector magnet 16 of printer 15. The calling and called subscribers may intercommunicate in this manner until they have no further message material to transmit and are prepared to disconnect. This is accomplished by the transmission, by either subscriber station of the code combination or sequence of code combinations which will cause momentary opening of contacts 79 of the monitoring teletypewriter at the fixed station. An end of message or disconnect signal frequently employed is the signal for the figures code combination followed by the signal for the character H. The contacts 79 are included in the locking circuit for relays 3–B and 3–KF, and both relays release. Relay 3–B interrupts the energizing circuit for relay 3–C which releases, and opens the circuit for teletypewriter operating motor 87 which stops. Relay 3–C disconnects the teletypewriter from the loop which terminated line conductors 101 and 102, and connects ringer 141 in series with blocking condenser 142 between conductor 101 and ground, and provides a terminating ground for conductor 102 traced through the windings of relays 3–KC and 3–KB, armature and marking contact of relay 3–KA, back contact and lower armature of relay 3–C, conductors 90 and 97, winding of relay 3–A and conductors 96 and 94, and upper armature and back contact of relay 3–C to ground. The loop is thus interrupted at the fixed station and this brings up a disconnect signal in the remote switching center 105, in response to which the operator takes down the connection of the called subscriber to the line conductors 101 and 102. As part of the disconnect operation, the subscriber at the mobile station opens switch 19 to stop the motor 18 for his teletypewriter, and thus the mobile station is shut down.

Relay 3–A has been referred to hereinbefore without any statement of its purpose. This relay is used for starting, on an unattended basis, the line terminating equipment at the fixed station incident to the calling of the mobile subscriber station. Relay 3–A is a polarized relay, and in order to operate it, the operator at the switching center applies to line conductor 102 the reverse of the polarity ordinarily employed in signal transmission between the fixed station and the switching center over conductors 101 and 102. This polarity is applied over the path to ground terminating conductor 102 at the upper armature and back contact of relay 3–C, the path including the winding a relay 3–A, as previously described. Relay 3–A completes a circuit for relay 3–B, traced from power supply conductor 62 over conductor 63, armature and front contact of relay 3–A, conductors 143 and 68, winding of relay 3–B and conductors 69, 71 and 72 to power supply conductor 73. Relay 3–B locks in the circuit previously traced, and completes circuits for relay 3–C and motor 87. Relay 3–KF operates in parallel with relay 3–B. After the reverse polarity has been applied to line conductor 102 momentarily, it is removed and relay 3–A releases, relays 3–B, 3–C and 3–KF remaining operated. Relay 3–A does not respond to message signals transmitted between the fixed station and the switching center, because the polarity for transmission of those signals is such as to hold the armature of polarized relay 3–A away from its front contact.

The first spacing signal element transmitted by the switching center following the operation and locking of relay 3–B causes the operation of relay 3–KC to spacing, cutting off tube 2–V10B in the manner previously described, and releasing relay 2–K2 which initiates the transmission of a marking signal from radio transmitter 13 of the fixed station to radio receiver 12 of the mobile station. The detection of the marking signal by diode 1–V6 results in the cutting off of tube 1–V10A and the release of relay 1–K1. Relay 1–K1 completes the circuit of receiving lamp 128 which lights, indicating to the mobile station subscriber that the station is being called. The subscriber responds by operating switch 19 to start teletypewriter motor 18. The subscriber then waits until lamp 128 is extinguished, indicating that the transmission of the marking signal from the fixed station has ended, and that relay 1–K1 has reoperated, removing the shunt around transmitting contacts 17. The subscriber then transmits an acknowledgment and awaits message transmission of the calling station. At the conclusion of the transmission, one of the interconnected stations transmits the disconnect signal and the system is shut down in the manner previously described.

Although a specific embodiment of the invention has been shown in the drawings and described in the foregoing specification, the invention is not limited to that specific embodiment but is capable of modification, rearrangement and substitution of parts and elements without departing from the spirit of the invention.

What is claimed is:

1. In an alternating-current telegraph system, a normally dormant source of marking and spacing signal frequencies, a normally responsive signal frequency receiving circuit, telegraph signal generating means for controlling said source of frequencies, a telegraph recorder responsive to said signal generating means and to said receiving circuit, and means controlled by signals received by said signal frequency receiving circuit for disabling said signal generating means.

2. In an alternating-current telegraph system, a normally dormant source of marking and spacing signal frequencies, a normally responsive signal frequency receiving circuit, telegraph signal generating means for controlling said source of frequencies, a telegraph recorder responsive to said signal generating means and to said receiving circuit, and means controlled by said recorder when responding to signals generated by said signal generating means for disabling said signal frequency receiving circuit.

3. In an alternating-current telegraph system, a normally dormant source of marking and spacing signal frequencies, a normally responsive signal frequency receiving circuit, telegraph signal generating means for controlling said source of frequencies, a telegraph recorder responsive to said signal generating means and to said receiving circuit, means controlled by signals received by said signal frequency receiving circuit for disabling said signal generating means, and means for delaying reenablement of said signal generating means for a significant interval after cessation of signal frequency reception by said receiving circuit.

4. In an alternating-current telegraph system, a normally dormant source of marking and spacing signal frequencies, a normally responsive signal frequency receiving circuit, telegraph signal generating means for controlling said source of frequencies, a telegraph recorder responsive to said signal generating means and to said receiving circuit, means controlled by said recorder when responding to signals generated by said signal generating means for disabling said signal frequency receiving circuit, and means for delaying reenablement of said signal frequency receiving circuit for a significant interval after cessation of operation of said signal generating means.

5. In an alternating-current telegraph system, a normally dormant source of marking and spacing signal frequencies, telegraph signal generating means for controlling said source of frequencies, means responsive to said telegraph signal generating means for activating said source of marking and spacing signal frequencies, and means for delaying deactivation of said source for a significant interval following cessation of operation of said telegraph signal generating means.

6. In an alternating-current telegraph system, a normally dormant source of marking and spacing signal frequencies, telegraph signal generating means for controlling said source of frequencies, a telegraph recorder responsive to said signal generating means, means controlled by said recorder when responding to signals generated by said telegraph signal generating means for activating said source of marking and spacing signal frequencies, and means for delaying deactivation of said source for a significant interval following cessation of operation of said telegraph signal generating means.

7. In a telegraph system, a mobile station having radio frequency carrier transmitting and receiving equipment, teletypewriter transmitting apparatus adapted to effect distinctive modulation of said carrier according to marking and spacing signals, teletypewriter receiving apparatus adapted to record message characters derived from marking and spacing signals of similarly modulated received carrier, a fixed station having radio frequency carrier transmitting and receiving apparatus adapted to transmit to and receive from said mobile station, a telegraph network comprising a plurality of telegraph stations having teletypewriter transmitting and receiving equipment and a switching center having transmission channel connection with said telegraph stations and said fixed station, and switching means at said switching center for connecting any of said telegraph stations with said fixed station to provide teletypewriter intercommunication between the connected one of said telegraph stations and said mobile station.

8. In a telegraph system, a mobile station having radio frequency carrier transmitting and receiving equipment, a normally dormant source of marking and spacing signal frequencies for modulating the carrier generated by said carrier transmitting equipment, telegraph signal generating means for controlling said source of frequencies, a telegraph recorder responsive to said signal generating means, means controlled by said recorder when responding to signals generated by said signal generating means for activating said source of marking and spacing signal frequencies, a fixed station having radio frequency transmitting and receiving apparatus adapted to transmit to and receive from said mobile station and a normally dormant source of marking and spacing frequencies, a switching center connected to said fixed station by a transmission channel, and means responsive only to signals received at said fixed station over said transmission channel for activating said marking and spacing frequency source at said fixed station.

9. In a telegraph system, a mobile station having radio frequency carrier transmitting and receiving equipment, a normally dormant source of marking and spacing signal frequencies for modulating the carrier generated by said carrier transmitting equipment, telegraph signal generating means for controlling said source of frequencies, a telegraph recorder responsive to said signal generating means, means controlled by said recorder when responding to signals generated by said signal generating means for activating said source of marking and spacing signal frequencies, a fixed station having radio frequency transmitting and receiving apparatus adapted to transmit to and receive from said mobile station and a normally dormant telegraph recorder, and means responsive to marking signal transmission received at said fixed station from said mobile station for activating the telegraph recorder at said fixed station.

10. In a telegraph system, a mobile station having radio frequency carrier transmitting and receiving equipment, a normally dormant source of marking and spacing signal frequencies for modulating the carrier generated by said carrier transmitting equipment, telegraph signal generating means for controlling said source of frequencies, a telegraph recorder responsive to said signal generating means, means controlled by said recorder when responding to signals generated by said signal generating means for activating said source of marking and spacing signal frequencies, a fixed station having radio frequency transmitting and receiving apparatus adapted to transmit to and receive from said mobile station and a normally dormant telegraph recorder, means responsive to marking signal transmission received at said fixed station from said mobile station for activating the telegraph recorder at said fixed station, and means responsive to a code signal representing a message end for deactivating the recorder at said fixed station.

11. In a telegraph system, a mobile station having radio frequency carrier transmitting and receiving equipment, a normally dormant source of marking and spacing signal frequencies for modulating the carrier generated by said carrier transmitting equipment, telegraph signal generating means for controlling said source of frequencies, a telegraph recorder responsive to said signal generating means, means controlled by said recorder when responding to signals generated by said signal generating means for activating said source of marking and spacing signal frequencies, a fixed station having radio frequency transmitting and receiving apparatus adapted to transmit to and receive from said mobile station and a normally dormant telegraph recorder, a switching center connected to said fixed station by a transmission channel, and means at said fixed station responsive to a calling signal received from said mobile station or said switching center for activating the telegraph recorder at said fixed station.

12. In a telegraph system, a mobile station having radio frequency carrier transmitting and receiving equipment, a normally dormant source of marking and spacing signal frequencies for modulating the carrier generated by said carrier transmitting equipment, telegraph signal generating means for controlling said source of frequencies, a telegraph recorder responsive to said signal generating means, means controlled by said recorder when responding to signals generated by said signal generating means for activating said source of marking and spacing signal frequencies, a fixed station having radio frequency transmitting and receiving apparatus adapted to transmit to and receive from said mobile station and a normally dormant telegraph recorder, a switching center connected to said fixed station by a transmission channel, means at said fixed station responsive to a calling signal received from said mobile station or said switching center for activating the telegraph recorder at said fixed station, and means responsive to an end-of-message signal received at said fixed station from said mobile station or said switching center for restoring the telegraph recorder at said fixed station to dormant condition.

References Cited in the file of this patent

UNITED STATES PATENTS

| | | |
|---|---|---|
| 2,008,389 | Finch | July 16, 1936 |
| 2,474,261 | Liebe et al. | June 28, 1949 |
| 2,523,748 | Wilson | Sept. 26, 1950 |
| 2,531,103 | Beckwith | Nov. 21, 1950 |
| 2,636,941 | Singel et al. | Apr. 28, 1953 |